(12) United States Patent
Chen

(10) Patent No.: US 11,586,016 B2
(45) Date of Patent: Feb. 21, 2023

(54) LENS ASSEMBLY

(71) Applicants: Sintai Optical (Shenzhen) Co., Ltd., ShenZhen (CN); Asia Optical Co., Inc., Taichung (TW)

(72) Inventor: Yuan-Chen Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 312 days.

(21) Appl. No.: 16/820,772

(22) Filed: Mar. 17, 2020

(65) Prior Publication Data
US 2020/0301111 A1 Sep. 24, 2020

(30) Foreign Application Priority Data
Mar. 18, 2019 (CN) .......................... 201910202966.6

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 13/006* (2013.01); *G02B 27/0025* (2013.01)

(58) Field of Classification Search
CPC ........ G02B 9/62; G02B 9/64; G02B 13/0045; G02B 13/006; G02B 13/04; G02B 13/06; G02B 27/0025
See application file for complete search history.

(56) References Cited

U.S. PATENT DOCUMENTS

2018/0284397 A1  10/2018  Komiyama
2018/0348491 A1  12/2018  Lee

FOREIGN PATENT DOCUMENTS

| CN | 105974561 A | 9/2016 |
|---|---|---|
| CN | 108152914 A | 6/2018 |
| JP | 2018159898 A | 10/2018 |
| JP | 2019040117 A | 3/2019 |
| WO | 2018021205 A1 | 2/2018 |

*Primary Examiner* — Jack Dinh
(74) *Attorney, Agent, or Firm* — McClure, Qualey & Rodack, LLP

(57) ABSTRACT

A lens assembly includes a first lens, a second lens, a third lens, a fourth lens, a fifth lens, a sixth lens, and a seventh lens, all of which are arranged in order from an object side to an image side along an optical axis. The first lens is with negative refractive power. The second lens is a meniscus lens and includes a convex surface facing the object side and a concave surface facing the image side. The third lens includes a concave surface facing the object side. The fourth lens is with positive refractive power and includes a convex surface facing the object side. The fifth lens includes a convex surface facing the image side. The sixth lens is with negative refractive power. The seventh lens is with positive refractive power and includes a convex surface facing the object side. The fifth lens and the sixth lens are cemented.

11 Claims, 12 Drawing Sheets

LENS ASSEMBLY

CROSS REFERENCE TO RELATED APPLICATIONS

This application claims priority of China Patent Application No. 201910202966.6, filed on Mar. 18, 2019, the entirety of which is incorporated by reference herein.

BACKGROUND OF THE INVENTION

Field of the Invention

The invention relates to a lens assembly.

Description of the Related Art

The current development trend of a lens assembly is toward large field of view. Additionally, the lens assembly is developed to have high resolution and resisted environmental temperature change in accordance with different application requirements. However, the known lens assembly can't satisfy such requirements. Therefore, the lens assembly needs a new structure in order to meet the requirements of large field of view, high resolution, and resisted environmental temperature change at the same time.

BRIEF SUMMARY OF THE INVENTION

The invention provides a lens assembly to solve the above problems. The lens assembly of the invention is provided with characteristics of an increased field of view, an increased resolution, a resisted environmental temperature change, and still has a good optical performance.

The lens assembly in accordance with an exemplary embodiment of the invention includes a first lens, a second lens, a third lens, a fourth lens, a fifth lens, a sixth lens, and a seventh lens, all of which are arranged in order from an object side to an image side along an optical axis. The first lens is with negative refractive power. The second lens is a meniscus lens with refractive power and includes a convex surface facing the object side and a concave surface facing the image side. The third lens is with refractive power and includes a concave surface facing the object side. The fourth lens is with positive refractive power and includes a convex surface facing the object side. The fifth lens is with refractive power and includes a convex surface facing the image side. The sixth lens is with negative refractive power. The seventh lens is with positive refractive power and includes a convex surface facing the object side. The fifth lens and the sixth lens are cemented. The combined focal length of the fifth lens and the sixth lens is with negative refractive power, the lens assembly includes at least one cemented lens to reduce color aberration.

The lens assembly in accordance with another exemplary embodiment of the invention includes a first lens, a second lens, a third lens, a fourth lens, a fifth lens, a sixth lens, and a seventh lens, all of which are arranged in order from an object side to an image side along an optical axis. The first lens is with negative refractive power. The second lens is a meniscus lens with refractive power and includes a convex surface facing the object side and a concave surface facing the image side. The third lens is with refractive power and includes a concave surface facing the object side. The fourth lens is with positive refractive power and includes a convex surface facing the object side. The fifth lens is with refractive power and includes a convex surface facing the image side. The sixth lens is with negative refractive power. The seventh lens is with positive refractive power and includes a convex surface facing the object side. The lens assembly satisfies: $0.5<R_{31}/R_{32}<1.5$; wherein $R_{31}$ is a radius of curvature of an object side surface of the third lens and $R_{32}$ is a radius of curvature of an image side surface of the third lens.

In another exemplary embodiment, the lens assembly satisfies: $0.5<R_{31}/R_{32}<1.5$; wherein $R_{31}$ is a radius of curvature of an object side surface of the third lens and $R_{32}$ is a radius of curvature of an image side surface of the third lens.

In yet another exemplary embodiment, the lens assembly satisfies: $0.3<|f_2/f_3|<0.9$; wherein $f_2$ is an effective focal length of the second lens and $f_3$ is an effective focal length of the third lens.

In another exemplary embodiment, the lens assembly satisfies: $1<|f_3/f_4|<7$; wherein $f_3$ is an effective focal length of the third lens and $f_4$ is an effective focal length of the fourth lens.

In yet another exemplary embodiment, the lens assembly satisfies: $1<R_{12}/R_{41}<2.5$; wherein $R_{21}$ is a radius of curvature of an object side surface of the second lens and $R_{41}$ is a radius of curvature of an object side surface of the fourth lens.

In another exemplary embodiment, the second lens is with negative refractive power, the third lens further includes a convex surface facing the image side, and the fifth lens is with positive refractive power.

In yet another exemplary embodiment, the first lens includes a convex surface facing the object side and a concave surface facing the image side, the fourth lens further includes a convex surface facing the image side, the fifth lens further includes a convex surface facing the object side, the sixth lens includes a concave surface facing the object side and another concave surface facing the image side, and the seventh lens further includes a convex surface facing the image side.

In another exemplary embodiment, the lens assembly further includes a stop disposed between the third lens and the fourth lens.

In yet another exemplary embodiment, both of an object side surface and an image side surface of the third lens are aspheric surfaces, both of an object side surface and an image side surface of the fourth lens are aspheric surfaces, and both of an object side surface and an image side surface of the seventh lens are aspheric surfaces.

In another exemplary embodiment, the lens assembly further includes a stop disposed between the object side and the fourth lens.

In yet another exemplary embodiment, the lens assembly satisfies: $0.3<f_2/f_3|<0.9$; $1<|f_3/f_4|<7$; $1<R_{21}/R_{41}<2.5$; wherein $f_2$ is an effective focal length of the second lens, $f_3$ is an effective focal length of the third lens, $f_4$ is an effective focal length of the fourth lens, $R_{21}$ is a radius of curvature of an object side surface of the second lens, and $R_{41}$ is a radius of curvature of an object side surface of the fourth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
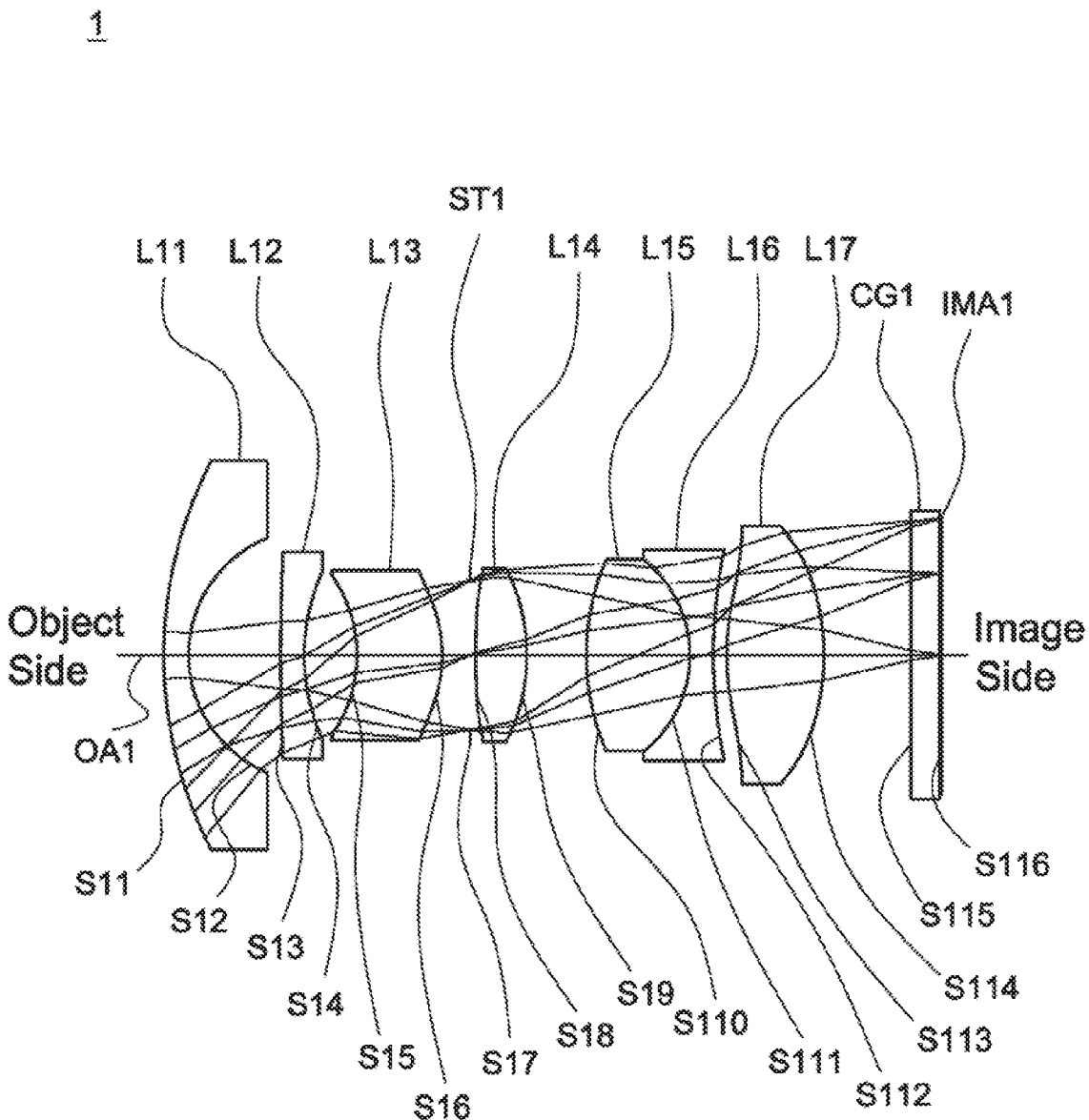
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, a fifth lens, a sixth lens, and a seventh lens. The first lens is with negative refractive power. The second lens is a meniscus lens with refractive power and includes a convex surface facing an object side and a concave surface facing an image side. The third lens is with refractive power and includes a concave surface facing the object side. The fourth lens is with positive refractive power and includes a convex surface facing the object side. The fifth lens is with refractive power and includes a convex surface facing the image side. The sixth lens is with negative refractive power. The seventh lens is with positive refractive power and includes a convex surface facing the object side. The first lens, the second lens, the third lens, the fourth lens, the fifth lens, the sixth lens, and the seventh lens are arranged in order from the object side to the image side along an optical axis. The fifth lens and the sixth lens are cemented. The combined focal length of the fifth lens and the sixth lens is with negative refractive power, the lens assembly includes at least one cemented lens to reduce color aberration.

The present invention provides another lens assembly including a first lens, a second lens, a third lens, a fourth lens, a fifth lens, a sixth lens, and a seventh lens. The first lens is with negative refractive power. The second lens is a meniscus lens with refractive power and includes a convex surface facing an object side and a concave surface facing an image side. The third lens is with refractive power and includes a concave surface facing the object side. The fourth lens is with positive refractive power and includes a convex surface facing the object side. The fifth lens is with refractive power and includes a convex surface facing the image side. The sixth lens is with negative refractive power. The seventh lens is with positive refractive power and includes a convex surface facing the object side. The first lens, the second lens, the third lens, the fourth lens, the fifth lens, the sixth lens, and the seventh lens are arranged in order from the object side to the image side along an optical axis. The lens assembly satisfies: $0.5 < R_{31}/R_{32} < 1.5$; wherein $R_{31}$ is a radius of curvature of an object side surface of the third lens and $R_{32}$ is a radius of curvature of an image side surface of the third lens.

Referring to Table 1, Table 2, Table 4, Table 5, Table 7, and Table 8, wherein Table 1, Table 4, and Table 7 show optical specifications in accordance with a first, second, and third embodiments of the invention respectively and Table 2, Table 5, and Table 8 show aspheric coefficients of each aspheric lens in Table 1, Table 4, and Table 7 respectively.

Figure 3:
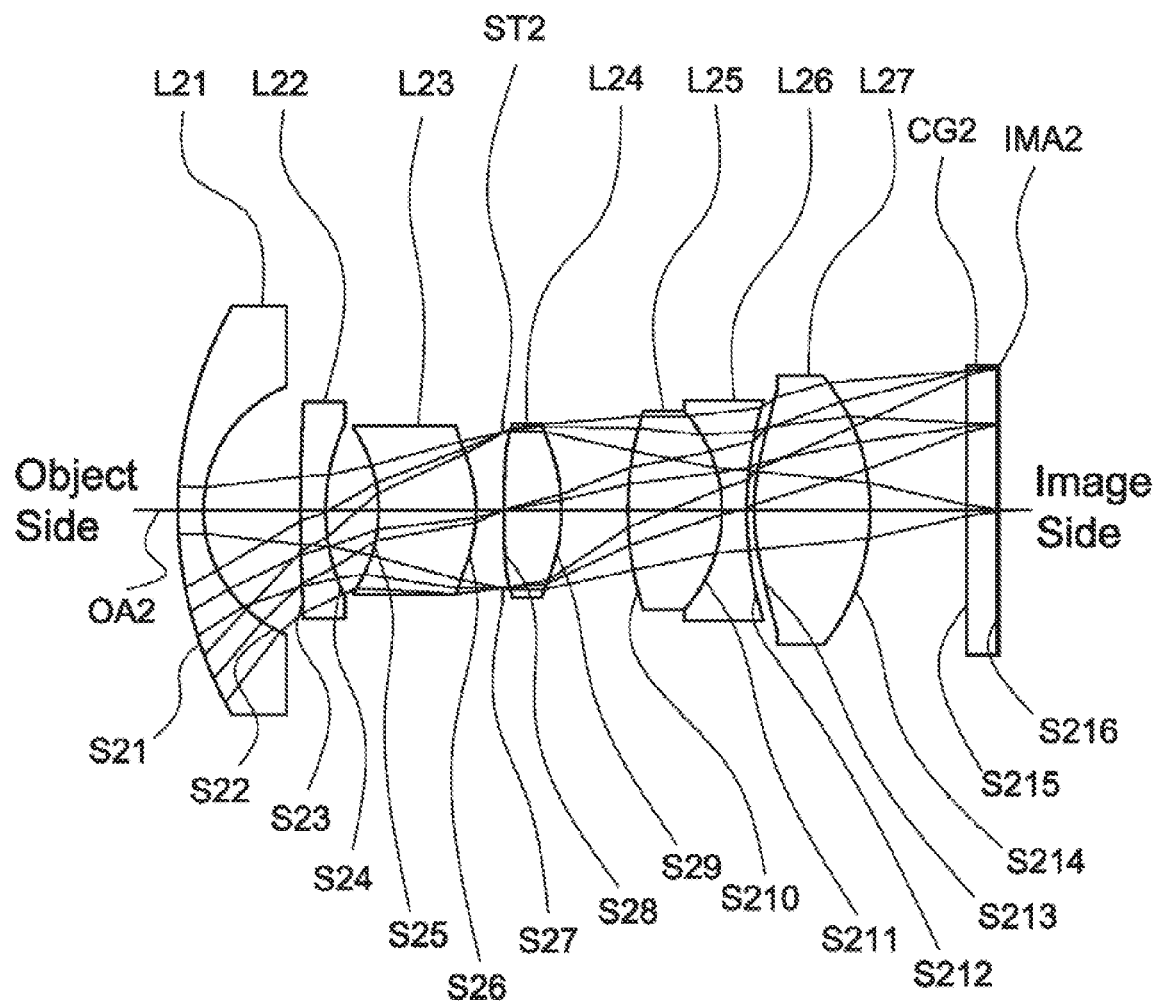
FIG. 3 is a lens layout and optical path diagram of a lens assembly in accordance with a second embodiment of the invention.
Figure 5:
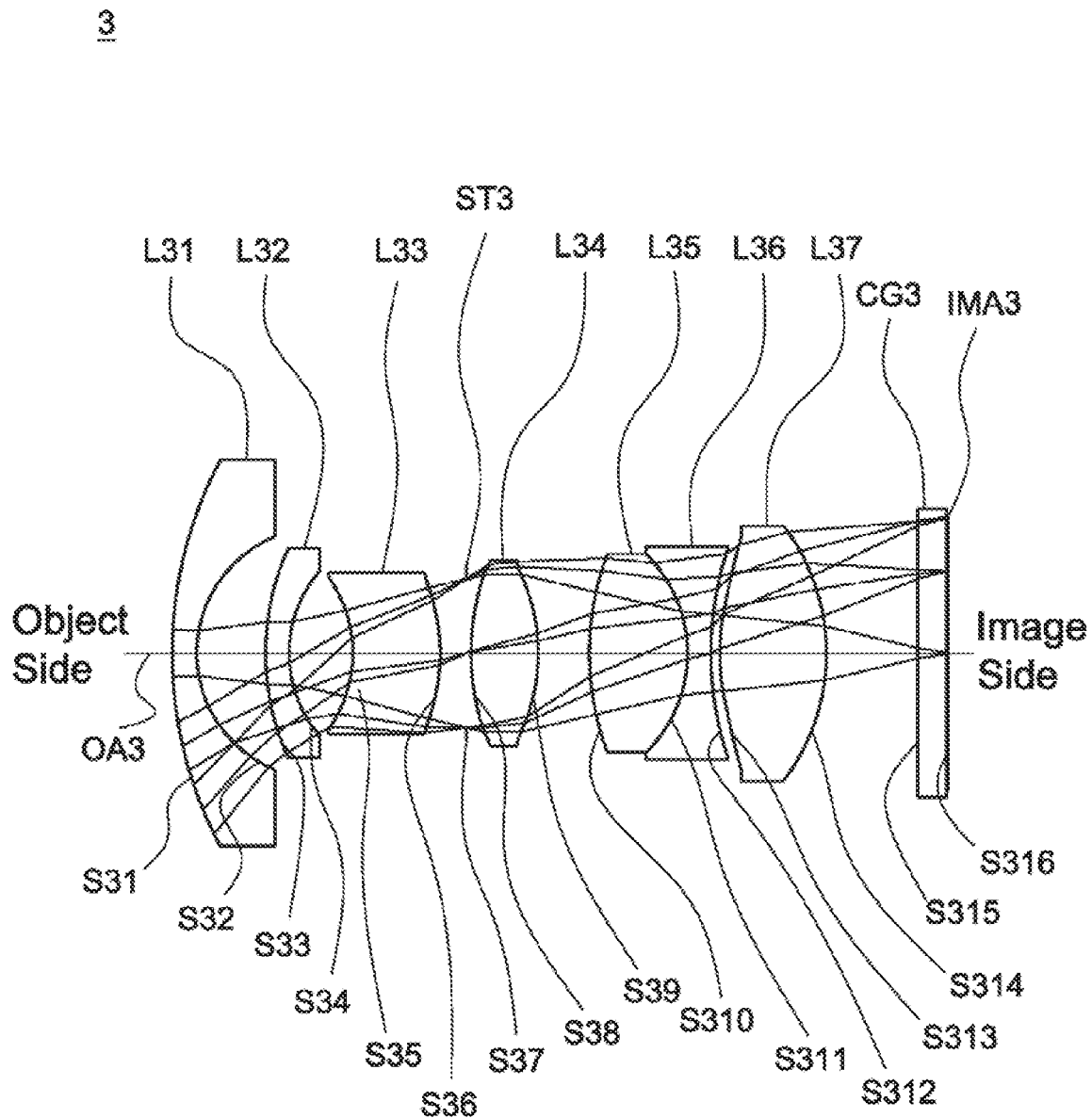
FIG. 5 is a lens layout and optical path diagram of a lens assembly in accordance with a third embodiment of the invention.

FIG. 1, FIG. 3, and FIG. 5 are lens layout and optical path diagrams of the lens assemblies in accordance with the first, second, and third embodiments of the invention respectively.

The first lenses L11, L21, L31 are with negative refractive power and made of glass material, wherein the object side surfaces S11, S21, S31 and the image side surfaces S12, S22, S32 are spherical surfaces.

The second lenses L12, L22, L32 are with refractive power and made of glass material, wherein the object side surfaces S13, S23, S33 are convex surfaces, the image side surfaces S14, S24, S34 are concave surfaces, and the object side surfaces S13, S23, S33 and the image side surfaces S14, S24, S34 are spherical surfaces.

The third lenses L13, L23, L33 are with refractive power and made of glass material, wherein the object side surfaces S15, S25, S35 are concave surfaces and the object side surfaces S15, S25, S35 and the image side surfaces S16, S26, S36 are aspheric surfaces.

The fourth lenses L14, L24, L34 are with positive refractive power and made of glass material, wherein the object side surfaces S18, S28, S38 are convex surfaces and the object side surfaces S18, S28, S38 and the image side surfaces S19, S29, S39 are aspheric surfaces.

The fifth lenses L15, L25, L35 are with refractive power and made of glass material, wherein the image side surfaces S111, S211, S311 are convex surfaces and the object side surfaces S110, S210, S310 and the image side surfaces S111, S211, S311 are spherical surfaces.

The sixth lenses L16, L26, L36 are with negative refractive power and made of glass material, wherein the object side surfaces S111, S211, S311 and the image side surfaces S112, S212, S312 are spherical surfaces.

The fifth lenses L15, L25, L35 and the sixth lenses L16, L26, L36 are cemented respectively.

The seventh lenses L17, L27, L37 are with positive refractive power and made of glass material, wherein the object side surfaces S113, S213, S313 are convex surfaces and the object side surfaces S113, S213, S313 and the image side surfaces S114, S214, S314 are aspheric surfaces.

In addition, the lens assemblies 1, 2, 3 satisfy at least one of the following conditions:

$$0.3 < |f_2/f_3| < 0.9; \quad (1)$$

$$1 < |f_3/f_4| < 7; \quad (2)$$

$$0.5<R_{31}/R_{32}<1.5; \quad (3)$$

$$1<R_{21}/R_{41}<2.5; \quad (4)$$

wherein $f_2$ is an effective focal length of the second lenses L12, L22, L32 for the first to third embodiments, $f_3$ is an effective focal length of the third lenses L13, L23, L33 for the first to third embodiments, $f_4$ is an effective focal length of the fourth lenses L14, L24, L34 for the first to third embodiments. $R_{21}$ is a radius of curvature of the object side surfaces S13, S23, S33 of the second lenses L12, L22, L32 for the first to third embodiments, $R_3$, is a radius of curvature of the object side surfaces S15, S25, S35 of the third lenses L13, L23, L33 for the first to third embodiments, $R_{32}$ is a radius of curvature of the image side surfaces S16, S26, S36 of the third lenses L13, L23, L33 for the first to third embodiments, and $R_{41}$ is a radius of curvature of the object side surfaces S18, S28, S38 of the fourth lenses L4, L24, L34 for the first to third embodiments. With the lens assemblies 1, 2, 3 satisfying at least one of the above conditions (1)-(4), the field of view can be effectively increased, the resolution can be effectively increased, the environmental temperature change can be effectively resisted, and the aberration can be effectively corrected.

When the condition (3): $0.5<R_{31}/R_{32}<1.5$ is satisfied, the field of view of the lens assembly can be effectively increased and the divergent light coming from the second lens will be converged to pass through the aperture after passing through the third lens.

A detailed description of a lens assembly in accordance with a first embodiment of the invention is as follows. Referring to FIG. 1, the lens assembly 1 includes a first lens L11, a second lens L12, a third lens L13, a stop ST1, a fourth lens L14, a fifth lens L15, a sixth lens L16, a seventh lens L17, and a cover glass CG1, all of which are arranged in order from an object side to an image side along an optical axis OA1. In operation, an image of light rays from the object side is formed at an image plane IMA1.

According to paragraphs [0029]-[0040], wherein: the first lens L11 is a meniscus lens, wherein the object side surface S11 is a convex surface and the image side surface S12 is a concave surface; the second lens L12 is a meniscus lens with negative refractive power; the third lens L13 is a meniscus lens with positive refractive power, wherein the image side surface S16 is a convex surface; the fourth lens L14 is a biconvex lens, wherein the image side surface S19 is a convex surface; the fifth lens L15 is a biconvex lens with positive refractive power, wherein the object side surface S110 is a convex surface; the sixth lens L16 is a biconcave lens, wherein the object side surface S111 is a concave surface and the image side surface S112 is a concave surface; the seventh lens L17 is a biconvex lens, wherein the image side surface S114 is a convex surface; and both of the object side surface S115 and image side surface S116 of the cover glass CG1 are plane surfaces.

With the above design of the lenses and stop ST1 and at least any one of the conditions (1)-(4) satisfied, the lens assembly 1 can have an effective increased field of view, an effective increased resolution, an effective resisted environmental temperature change, and is capable of an effective corrected aberration.

Table 1 shows the optical specification of the lens assembly 1 in FIG. 1.

TABLE 1

| Effective Focal Length = 2.187 mm | | | | F-number = 2.04 | | |
| Total Lens Length = 16.506 mm | | | | Field of View = 160.924 Degrees | | |

| Surface Number | Radius of Curvature (mm) | Thickness (mm) | Nd | Vd | Effective Focal Length (mm) | Remark |
| --- | --- | --- | --- | --- | --- | --- |
| S11 | 8.942 | 0.526 | 1.916 | 31.604 | −4.349 | The First Lens L11 |
| S12 | 2.689 | 1.950 | | | | |
| S13 | 50.526 | 0.499 | 1.593 | 35.310 | −7.915 | The Second Lens L12 |
| S14 | 4.297 | 1.130 | | | | |
| S15 | −3.047 | 1.802 | 1.854 | 40.599 | 9.415 | The Third Lens L13 |
| S16 | −2.816 | 0.598 | | | | |
| S17 | ∞ | 0.110 | | | | Stop ST1 |
| S18 | 24.634 | 1.077 | 1.548 | 45.784 | 6.859 | The Fourth Lens L14 |
| S19 | −4.339 | 1.274 | | | | |
| S110 | 5.209 | 2.192 | 1.497 | 81.546 | 3.840 | The Fifth Lens L15 |
| S111 | −2.599 | 0.500 | 1.923 | 20.880 | −2.773 | The Sixth Lens L16 |
| S112 | 11.087 | 0.278 | | | | |
| S113 | 4.755 | 2.062 | 1.518 | 63.503 | 5.143 | The Seventh Lens L17 |
| S114 | −5.129 | 1.851 | | | | |
| S115 | ∞ | 0.61 | 1.589 | 61.153 | | Cover Glass CG1 |
| S116 | ∞ | 0.045 | | | | |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each aspheric lens are shown in Table 2.

TABLE 2

| Surface Number | k | A | B | C | D | E |
|---|---|---|---|---|---|---|
| S15 | 1.028E−02 | −1.494E−02 | 1.856E−03 | 7.515E−04 | 1.870E−04 | −6.264E−05 |
| S16 | −1.326E+00 | 1.658E−03 | 8.023E−05 | 4.141E−04 | −5.070E−05 | 1.109E−05 |
| S18 | 9.419E+01 | 1.029E−02 | 8.739E−04 | 8.964E−05 | −1.732E−05 | 8.674E−06 |
| S19 | 1.277E+00 | −2.975E−03 | 8.278E−04 | 7.679E−05 | −4.806E−05 | −1.576E−05 |
| S113 | −2.185E+00 | −9.268E−03 | 8.990E−04 | −2.285E−04 | 2.128E−05 | 1.128E−07 |
| S114 | −2.415E+00 | −2.478E−03 | −4.586E−04 | 9.887E−05 | −2.230E−05 | 1.682E−06 |

Table 3 shows the parameters and condition values for conditions (1)-(4) in accordance with the first embodiment of the invention. It can be seen from Table 3 that the lens assembly 1 of the first embodiment satisfies the conditions (1)-(4).

TABLE 3

| $|f_2/f_3|$ | 0.841 | $|f_3/f_4|$ | 1.373 | $R_{31}/R_{32}$ | 1.082 |
|---|---|---|---|---|---|
| $R_{21}/R_{41}$ | 2.051 | | | | |

Figure 2A:
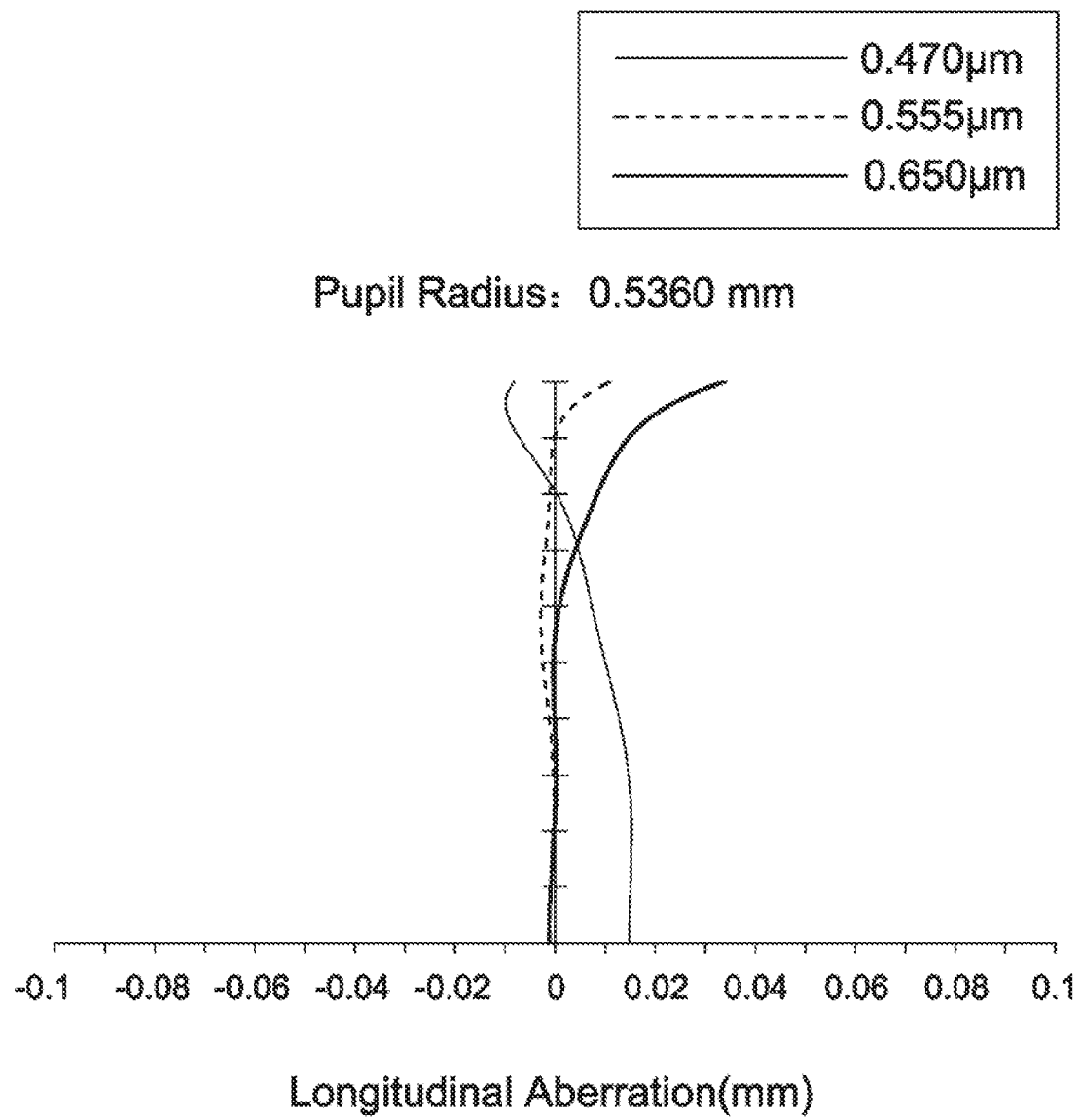
FIG. 2A depicts a longitudinal aberration diagram of the lens assembly in accordance with the first embodiment of the invention.
Figure 2B:
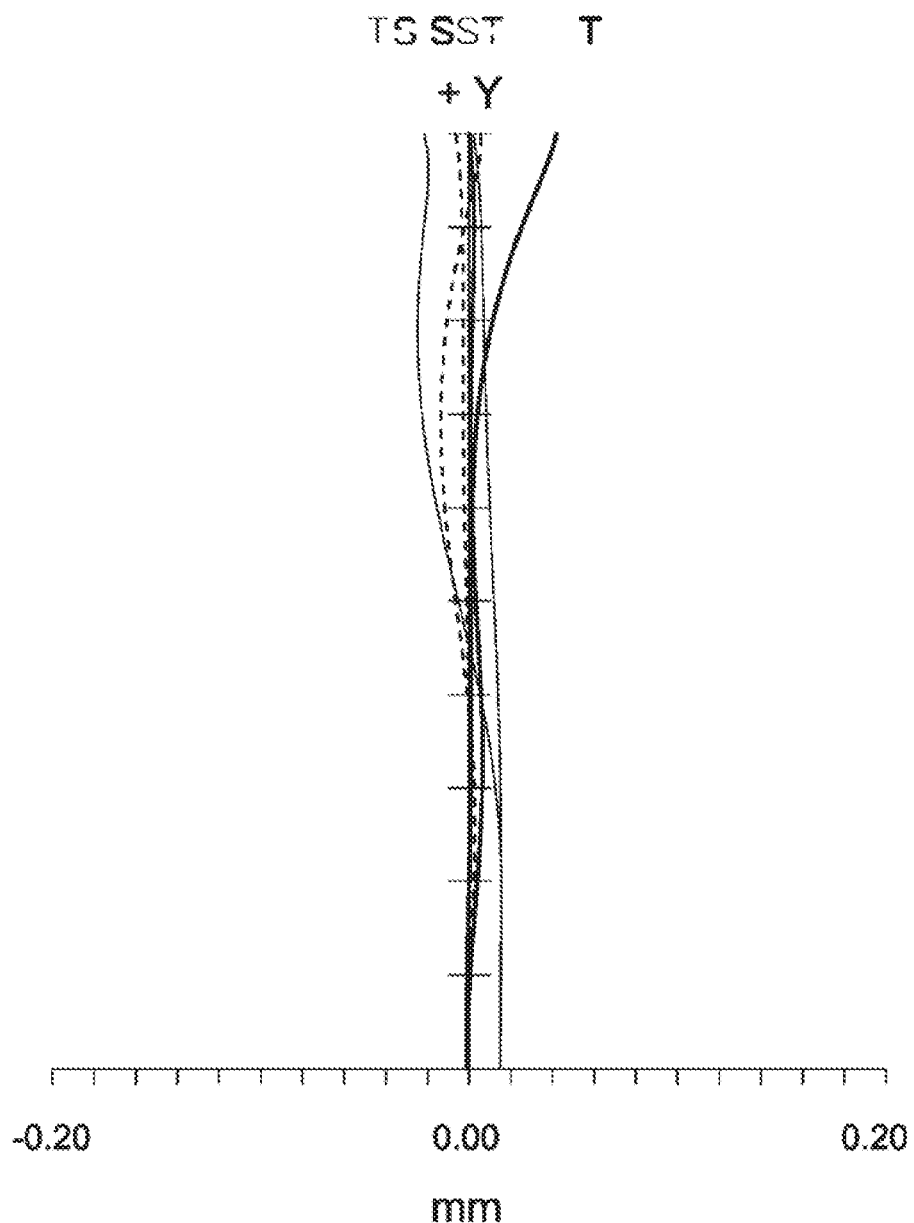
FIG. 2B is a field curvature diagram of the lens assembly in accordance with the first embodiment of the invention.
Figure 2C:
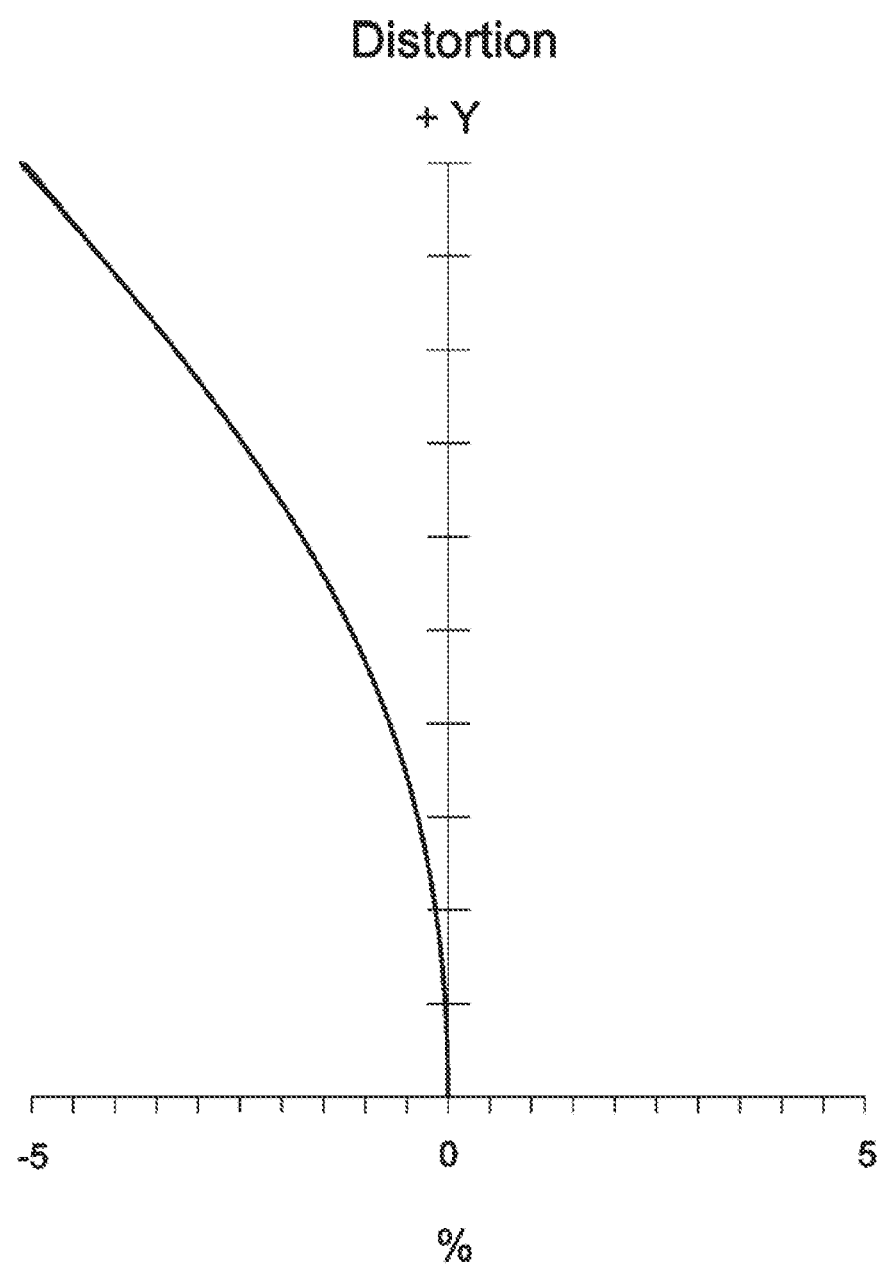
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C.

It can be seen from FIG. 2A that the longitudinal aberration in the lens assembly 1 of the first embodiment ranges from −0.01 mm to 0.04 mm.

It can be seen from FIG. 2B that the field curvature of tangential direction and sagittal direction in the lens assembly 1 of the first embodiment ranges from −0.03 mm to 0.04 mm.

It can be seen from FIG. 2C that the distortion in the lens assembly 1 of the first embodiment ranges from −5% to 0%.

It is obvious that the longitudinal aberration, the field curvature, and the distortion of the lens assembly 1 of the first embodiment can be corrected effectively. Therefore, the lens assembly 1 of the first embodiment is capable of good optical performance.

Referring to FIG. 3, FIG. 3 is a lens layout and optical path diagram of a lens assembly in accordance with a second embodiment of the invention. The lens assembly 2 includes a first lens L21, a second lens L22, a third lens L23, a stop ST2, a fourth lens L24, a fifth lens L25, a sixth lens L26, a seventh lens L27, and a cover glass CG2, all of which are arranged in order from an object side to an image side along an optical axis OA2. In operation, an image of light rays from the object side is formed at an image plane IMA2.

According to paragraphs [0029]-[0040], wherein: the first lens L21 is a meniscus lens, wherein the surface profiles of the first lens L21 approximate to that of the first lens L11 of the lens assembly 1 of the first embodiment, and is not described here again; the second lens L22 is a meniscus lens with negative refractive power; the third lens L23 is a meniscus lens with positive refractive power, wherein the surface profiles of the third lens L23 approximate to that of the third lens L13 of the lens assembly 1 of the first embodiment, and is not described here again; the fourth lens L24 is a biconvex lens, wherein the surface profiles of the fourth lens L24 approximate to that of the fourth lens L4 of the lens assembly 1 of the first embodiment, and is not described here again; the fifth lens L25 is a biconvex lens with positive refractive power, wherein the surface profiles of the fifth lens L25 approximate to that of the fifth lens L15 of the lens assembly 1 of the first embodiment, and is not described here again; the sixth lens L26 is a biconcave lens, wherein the surface profiles of the sixth lens L26 approximate to that of the sixth lens L6 of the lens assembly 1 of the first embodiment, and is not described here again; the seventh lens L27 is a biconvex lens, wherein the surface profiles of the seventh lens L27 approximate to that of the seventh lens L17 of the lens assembly 1 of the first embodiment, and is not described here again; and both of the object side surface S215 and image side surface S216 of the cover glass CG2 are plane surfaces.

With the above design of the lenses and stop ST2 and at least any one of the conditions (1)-(4) satisfied, the lens assembly 2 can have an effective increased field of view, an effective increased resolution, an effective resisted environmental temperature change, and is capable of an effective corrected aberration.

Table 4 shows the optical specification of the lens assembly 2 in FIG. 3.

TABLE 4

| Effective Focal Length = 2.159 mm | | | | | F-number = 2.04 | |
| Total Lens Length = 16.501 mm | | | | | Field of View = 161.004 Degrees | |

| Surface Number | Radius of Curvature (mm) | Thickness (mm) | Nd | Vd | Effective Focal Length (mm) | Remark |
|---|---|---|---|---|---|---|
| S21 | 8.281 | 0.515 | 1.916 | 31.604 | −4.546 | The First Lens L21 |
| S22 | 2.699 | 1.952 | | | | |
| S23 | 45.915 | 0.499 | 1.593 | 35.310 | −7.553 | The Second Lens L22 |
| S24 | 4.081 | 1.064 | | | | |
| S25 | −3.073 | 1.956 | 1.854 | 40.599 | 9.088 | The Third Lens L23 |
| S26 | −2.852 | 0.537 | | | | |
| S27 | ∞ | 0.024 | | | | Stop ST2 |
| S28 | 40.070 | 1.156 | 1.548 | 45.784 | 6.414 | The Fourth Lens L24 |

TABLE 4-continued

| | | | | | | |
|---|---|---|---|---|---|---|
| S29 | −3.791 | 1.332 | | | | |
| S210 | 6.484 | 1.894 | 1.497 | 81.546 | 4.406 | The Fifth Lens L25 |
| S211 | −2.996 | 0.499 | 1.923 | 20.880 | −2.249 | The Sixth Lens L26 |
| S212 | 7.500 | 0.149 | | | | |
| S213 | 4.277 | 2.326 | 1.518 | 63.503 | 4.504 | The Seventh Lens L17 |
| S214 | −4.157 | 1.943 | | | | |
| S215 | ∞ | 0.61 | 1.589 | 61.153 | | Cover Glass CG2 |
| S216 | ∞ | 0.045 | | | | |

The definition of aspheric surface sag z of each aspheric lens in table 4 is the same as that of in Table 1, and is not described here again.

In the second embodiment, the conic constant k and the aspheric coefficients A, B, C, D, E of each aspheric lens are shown in Table 5.

TABLE 5

| Surface Number | k | A | B | C | D | E |
|---|---|---|---|---|---|---|
| S25 | 3.019E−01 | −1.496E−02 | 2.012E−03 | 1.716E−03 | −5.160E−05 | −5.779E−05 |
| S26 | −1.451E+00 | 3.039E−03 | 5.793E−04 | 6.558E−04 | −1.159E−04 | 3.281E−05 |
| S28 | −3.895E+02 | 1.194E−02 | 1.320E−03 | −5.594E−04 | 3.298E−04 | −2.411E−05 |
| S29 | 1.204E+00 | −2.402E−03 | 8.739E−04 | 1.319E−03 | −5.818E−04 | 1.387E−04 |
| S213 | −1.793E+00 | −9.138E−03 | 1.012E−03 | −1.414E−04 | 1.395E−05 | −2.022E−07 |
| S214 | −2.279E+00 | −2.198E−03 | −3.803E−04 | 1.126E−04 | −1.960E−05 | 1.288E−06 |

Table 6 shows the parameters and condition values for conditions (1)-(4) in accordance with the second embodiment of the invention. It can be seen from Table 6 that the lens assembly 2 of the second embodiment satisfies the conditions (1)-(4).

TABLE 6

| $|f_2/f_3|$ | 0.831 | $|f_3/f_4|$ | 1.417 | $R_{31}/R_{32}$ | 1.078 |
|---|---|---|---|---|---|
| $R_{21}/R_{41}$ | 1.146 | | | | |

Figure 4A:
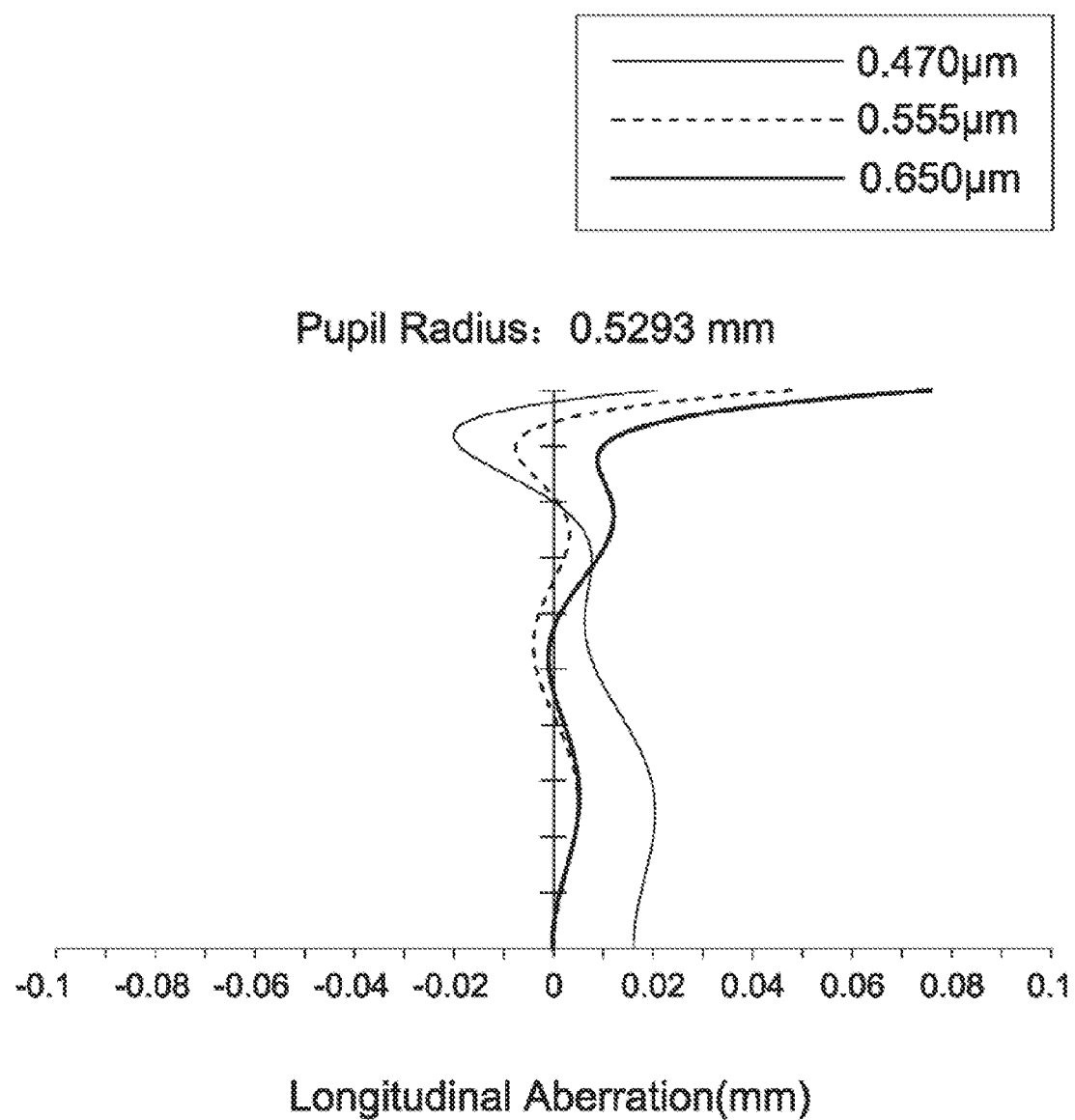
FIG. 4A depicts a longitudinal aberration diagram of the lens assembly in accordance with the second embodiment of the invention.
Figure 4B:
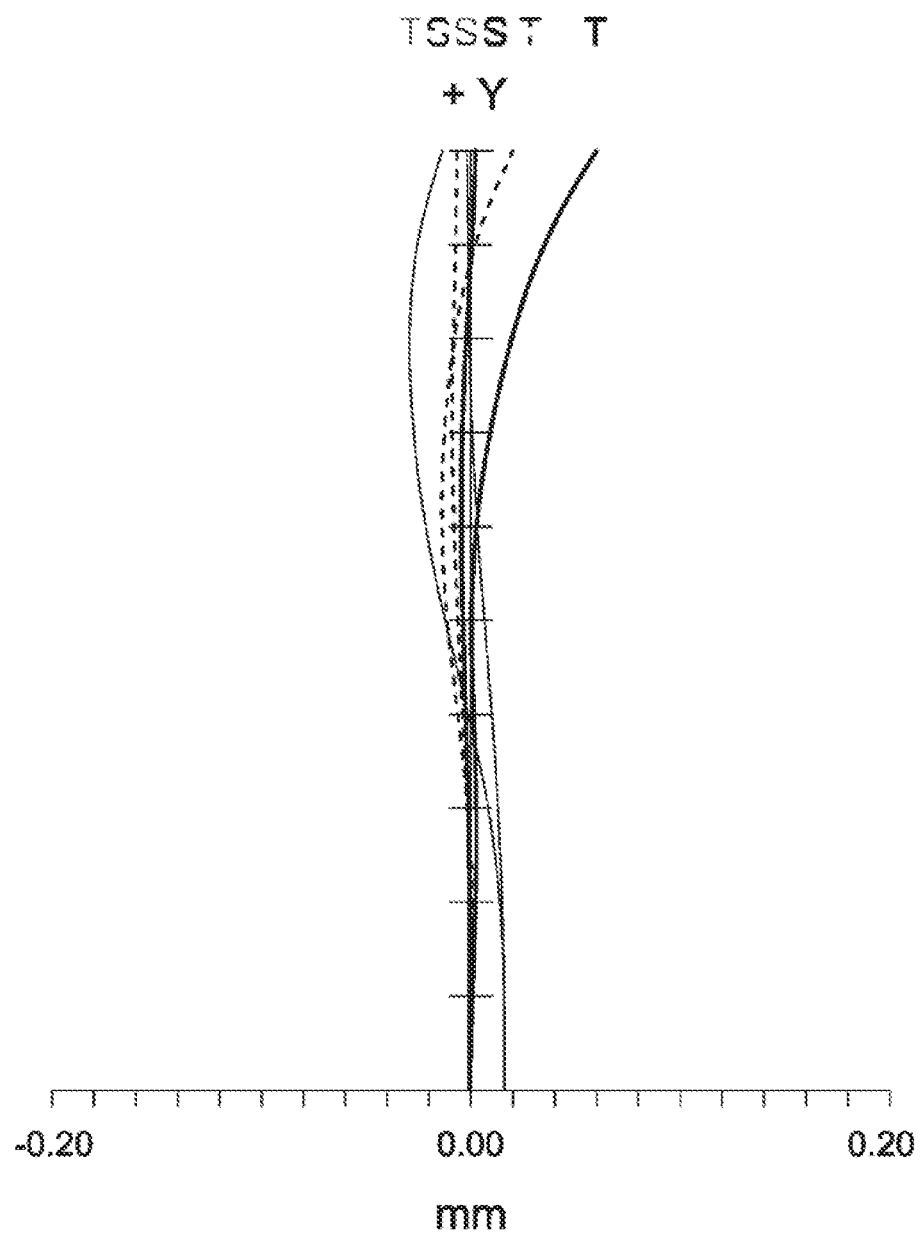
FIG. 4B is a field curvature diagram of the lens assembly in accordance with the second embodiment of the invention.
Figure 4C:
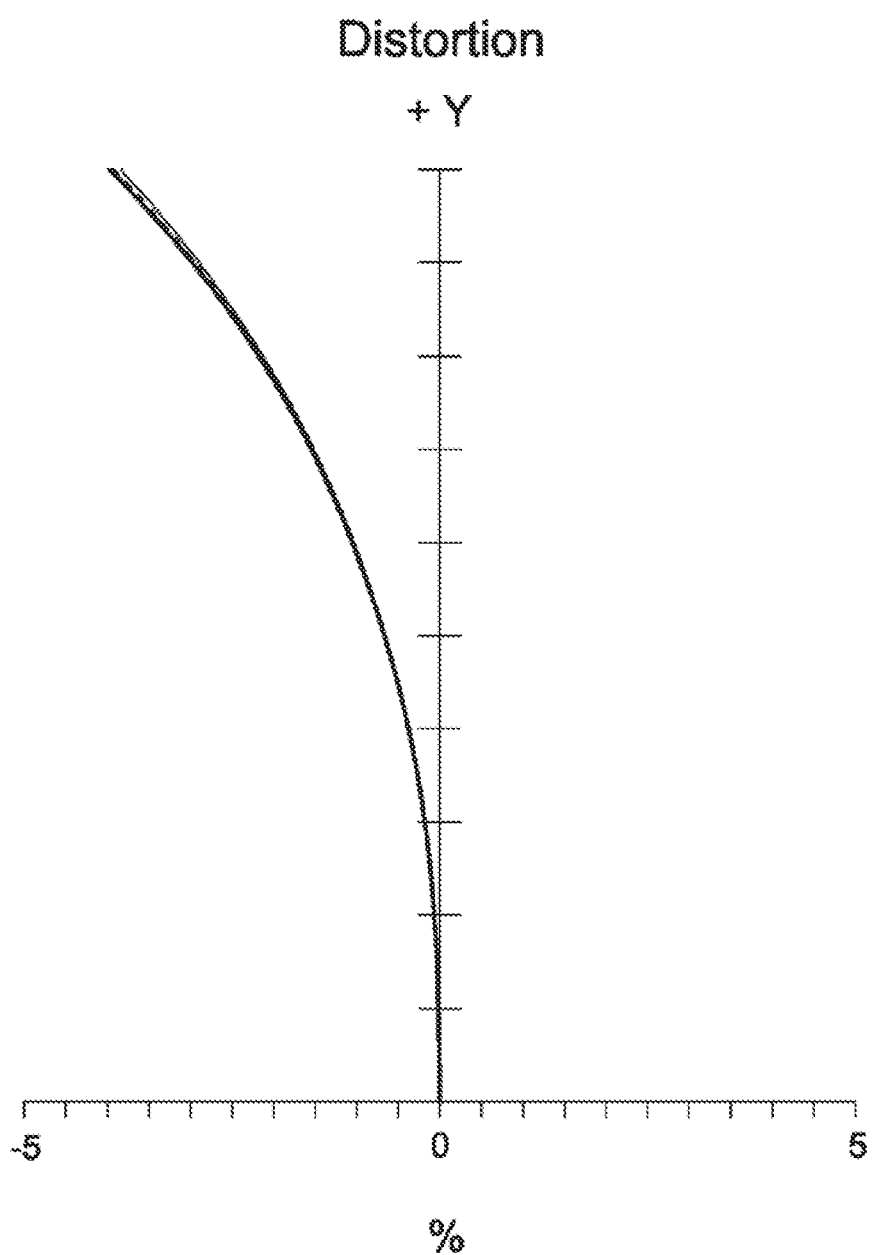
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C.

It can be seen from FIG. 4A that the longitudinal aberration in the lens assembly 2 of the second embodiment ranges from −0.02 mm to 0.08 mm.

It can be seen from FIG. 4B that the field curvature of tangential direction and sagittal direction in the lens assembly 2 of the second embodiment ranges from −0.04 mm to 0.06 mm.

It can be seen from FIG. 4C that the distortion in the lens assembly 2 of the second embodiment ranges from −4% to 0%.

It is obvious that the longitudinal aberration, the field curvature, and the distortion of the lens assembly 2 of the second embodiment can be corrected effectively. Therefore, the lens assembly 2 of the second embodiment is capable of good optical performance.

Referring to FIG. 5, FIG. 5 is a lens layout and optical path diagram of a lens assembly in accordance with a third embodiment of the invention. The lens assembly 3 includes a first lens L31, a second lens L32, a third lens L33, a stop ST3, a fourth lens L34, a fifth lens L35, a sixth lens L36, a seventh lens L37, and a cover glass CG3, all of which are arranged in order from an object side to an image side along an optical axis OA3. In operation, an image of light rays from the object side is formed at an image plane IMA3.

According to paragraphs [0029]-[0040], wherein: the first lens L31 is a meniscus lens, wherein the surface profiles of the first lens L31 approximate to that of the first lens L1 of the lens assembly 1 of the first embodiment, and is not described here again; the second lens L32 is a meniscus lens with negative refractive power; the third lens L33 is a meniscus lens with negative refractive power, wherein the surface profiles of the third lens L33 approximate to that of the third lens L13 of the lens assembly 1 of the first embodiment, and is not described here again; the fourth lens L34 is a biconvex lens, wherein the surface profiles of the fourth lens L34 approximate to that of the fourth lens L14 of the lens assembly 1 of the first embodiment, and is not described here again; the fifth lens L35 is a biconvex lens with positive refractive power, wherein the surface profiles of the fifth lens L35 approximate to that of the fifth lens L15 of the lens assembly 1 of the first embodiment, and is not described here again; the sixth lens L36 is a biconcave lens, wherein the surface profiles of the sixth lens L36 approximate to that of the sixth lens L16 of the lens assembly 1 of the first embodiment, and is not described here again; the seventh lens L37 is a biconvex lens, wherein the surface profiles of the seventh lens L37 approximate to that of the seventh lens L17 of the lens assembly 1 of the first embodiment, and is not described here again; and both of the object side surface S315 and image side surface S316 of the cover glass CG3 are plane surfaces.

With the above design of the lenses and stop ST3 and at least any one of the conditions (1)-(4) satisfied, the lens assembly 3 can have an effective increased field of view, an effective increased resolution, an effective resisted environmental temperature change, and is capable of an effective corrected aberration.

Table 7 shows the optical specification of the lens assembly 3 in FIG. 5.

TABLE 7

| Effective Focal Length = 2.176 mm | | | | F-number = 2.04 | | |
| Total Lens Length = 16.509 mm | | | | Field of View = 160.908 Degrees | | |

| Surface Number | Radius of Curvature (mm) | Thickness (mm) | Nd | Vd | Effective Focal Length (mm) | Remark |
|---|---|---|---|---|---|---|
| S31 | 8.758 | 0.521 | 1.916 | 31.604 | −4.375 | The First Lens L31 |
| S32 | 2.682 | 1.465 | | | | |
| S33 | 5.399 | 0.500 | 1.593 | 35.310 | −9.714 | The Second Lens L32 |
| S34 | 2.697 | 1.353 | | | | |
| S35 | −2.968 | 1.856 | 1.854 | 40.393 | −27.923 | The Third Lens L33 |
| S36 | −4.367 | 0.561 | | | | |
| S37 | ∞ | 0.094 | | | | Stop ST3 |
| S38 | 4.339 | 1.430 | 1.548 | 45.784 | 4.164 | The Fourth Lens L34 |
| S39 | −4.204 | 1.090 | | | | |
| S310 | 5.999 | 2.086 | 1.497 | 81.546 | 4.321 | The Fifth Lens L35 |
| S311 | −2.968 | 0.500 | 1.923 | 20.880 | −2.197 | The Sixth Lens L36 |
| S312 | 7.102 | 0.187 | | | | |
| S313 | 4.262 | 2.269 | 1.518 | 63.503 | 4.699 | The Seventh Lens L37 |
| S314 | −4.617 | 1.943 | | | | |
| S315 | ∞ | 0.61 | 1.589 | 61.153 | | Cover Glass CG3 |
| S316 | ∞ | 0.045 | | | | |

The definition of aspheric surface sag z of each aspheric lens in table 7 is the same as that of in Table 1, and is not described here again.

In the third embodiment, the conic constant k and the aspheric coefficients A, B, C, D, E of each aspheric lens are shown in Table 8.

TABLE 8

| Surface Number | k | A | B | C | D | E |
|---|---|---|---|---|---|---|
| S35 | −5.195E−02 | −1.340E−02 | 2.211E−03 | −6.153E−04 | 9.215E−04 | −1.879E−04 |
| S36 | 1.157E+00 | −8.166E−03 | 4.493E−03 | −4.097E−04 | 5.495E−05 | 1.051E−05 |
| S38 | −1.278E+00 | 2.285E−03 | 3.272E−04 | 1.136E−04 | 6.783E−05 | −6.257E−06 |
| S39 | 1.830E+00 | −8.395E−04 | −5.839E−04 | 1.090E−03 | −2.868E−04 | 4.783E−05 |
| S313 | −3.759E+00 | −8.225E−03 | 1.419E−03 | −3.683E−04 | 6.205E−05 | −3.332E−06 |
| S314 | −1.730E+00 | −2.617E−03 | −3.751E−04 | 1.166E−04 | −2.368E−05 | 1.881E−06 |

Table 9 shows the parameters and condition values for conditions (1)-(4) in accordance with the third embodiment of the invention. It can be seen from Table 9 that the lens assembly 3 of the third embodiment satisfies the conditions (1)-(4).

TABLE 9

| $|f_2/f_3|$ | 0.348 | $|f_3/f_4|$ | 6.706 | $R_{31}/R_{32}$ | 0.680 |
| $R_{21}/R_{41}$ | 1.244 | | | | |

Figure 6A:
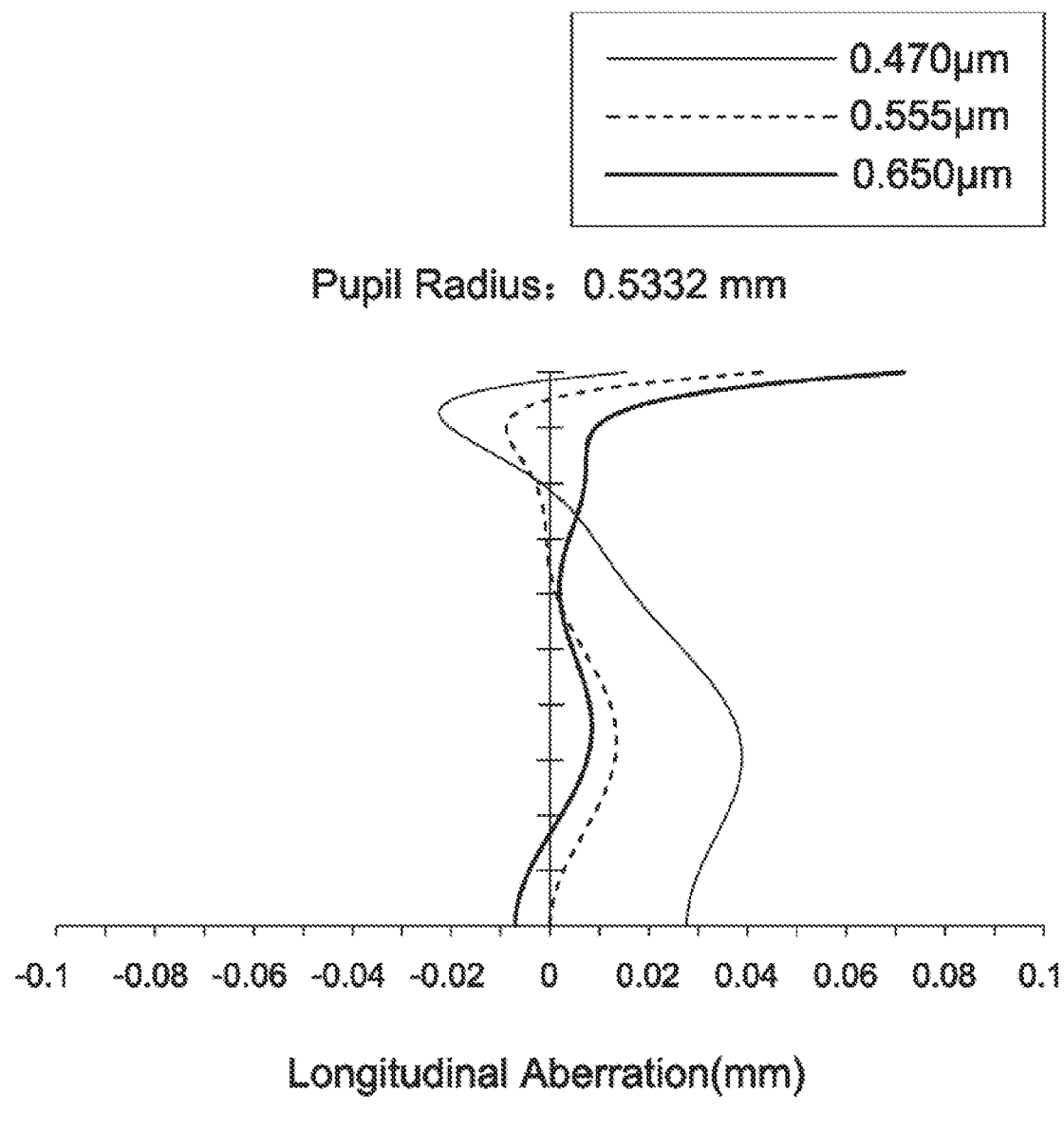
FIG. 6A depicts a longitudinal aberration diagram of the lens assembly in accordance with the third embodiment of the invention.
Figure 6B:
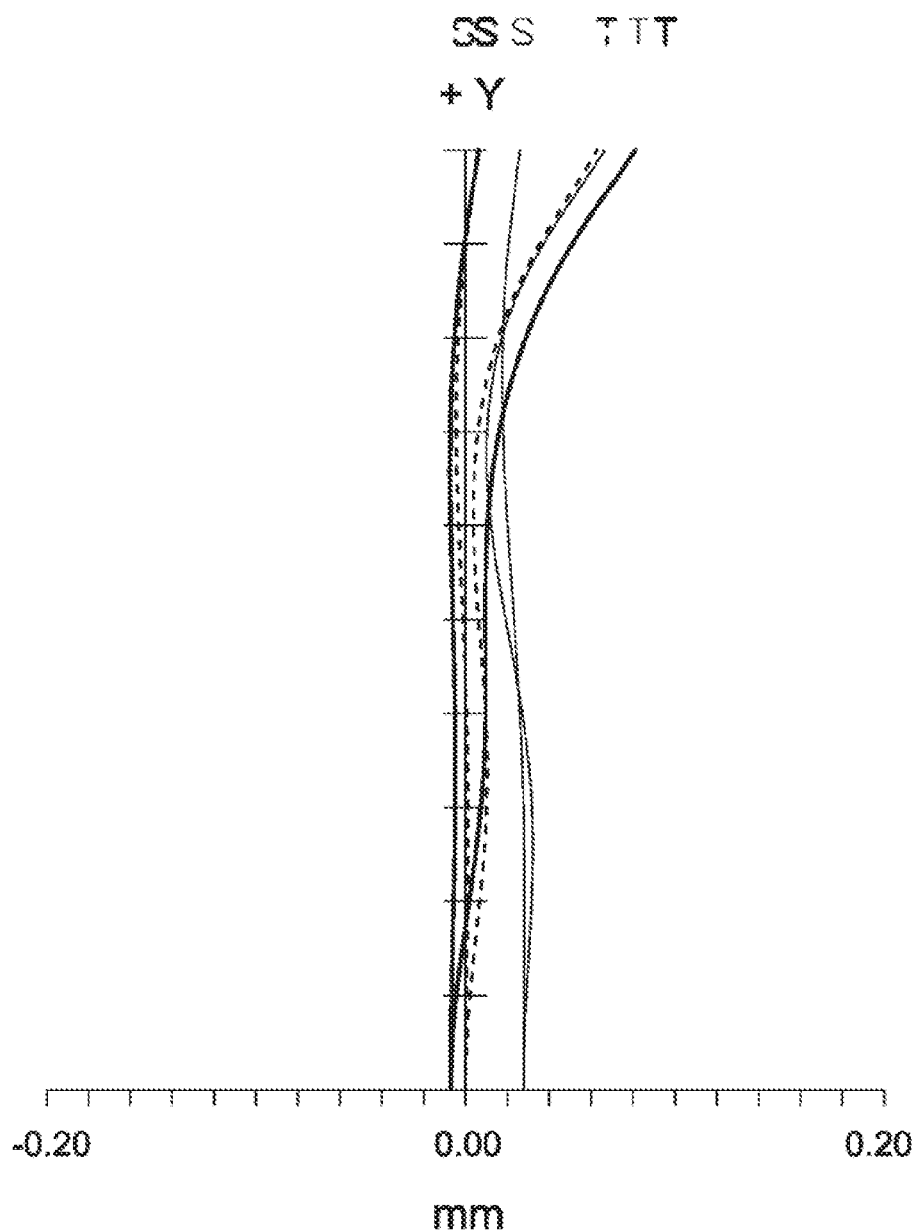
FIG. 6B is a field curvature diagram of the lens assembly in accordance with the third embodiment of the invention.
Figure 6C:
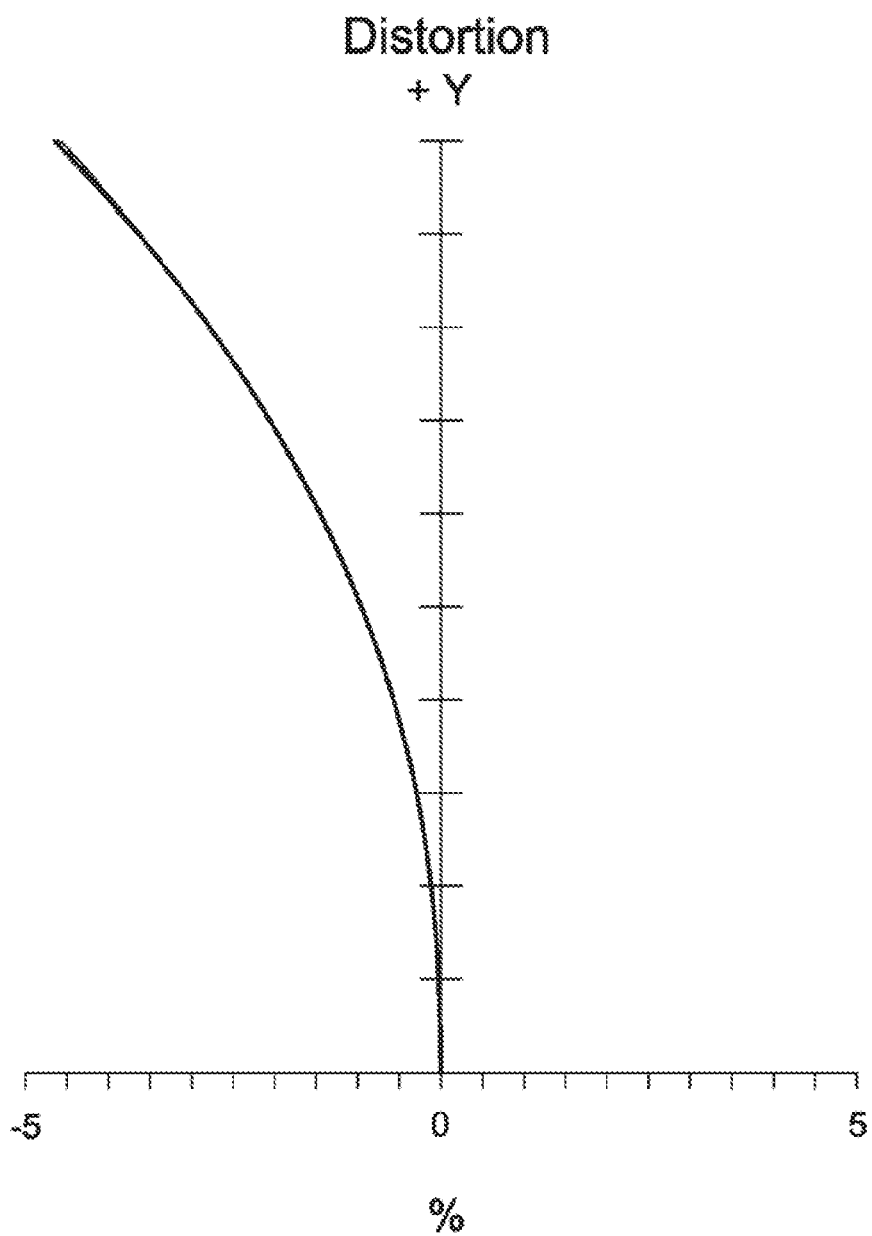
FIG. 6C is a distortion diagram of the lens assembly in accordance with the third embodiment of the invention.

By the above arrangements of the lenses and stop ST3, the lens assembly 3 of the third embodiment can meet the requirements of optical performance as seen in FIGS. 6A-6C.

It can be seen from FIG. 6A that the longitudinal aberration in the lens assembly 3 of the third embodiment ranges from −0.03 mm to 0.07 mm.

It can be seen from FIG. 6B that the field curvature of tangential direction and sagittal direction in the lens assembly 3 of the third embodiment ranges from −0.02 mm to 0.08 mm.

It can be seen from FIG. 6C that the distortion in the lens assembly 3 of the third embodiment ranges from −5% to 0%.

It is obvious that the longitudinal aberration, the field curvature, and the distortion of the lens assembly 3 of the third embodiment can be corrected effectively. Therefore, the lens assembly 3 of the third embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
    a first lens which is with negative refractive power;
    a second lens which is a meniscus lens with refractive power and comprises a convex surface facing an object side and a concave surface facing an image side;

a third lens which is with refractive power and comprises a concave surface facing the object side;
a fourth lens which is with positive refractive power and comprises a convex surface facing the object side;
a fifth lens which is with refractive power and comprises a convex surface facing the image side;
a sixth lens which is with negative refractive power; and
a seventh lens which is with positive refractive power and comprises a convex surface facing the object side;
a stop disposed between the object side and the fourth lens;
wherein the first lens, the second lens, the third lens, the fourth lens, the fifth lens, the sixth lens, and the seventh lens are arranged in order from the object side to the image side along an optical axis;
wherein the fifth lens and the sixth lens are cemented.

2. The lens assembly as claimed in claim 1, wherein the lens assembly satisfies:

$$0.5<R_{31}/R_{32}<1.5;$$

wherein $R_{31}$ is a radius of curvature of an object side surface of the third lens and $R_{32}$ is a radius of curvature of an image side surface of the third lens.

3. The lens assembly as claimed in claim 2, wherein the lens assembly satisfies:

$$1<|f_3/f_4|<7;$$

wherein $f_3$ is an effective focal length of the third lens and $f_4$ is an effective focal length of the fourth lens.

4. The lens assembly as claimed in claim 2, wherein the lens assembly satisfies:

$$1<R_{21}/R_{41}<2.5;$$

wherein $R_{21}$ is a radius of curvature of an object side surface of the second lens and $R_{41}$ is a radius of curvature of an object side surface of the fourth lens.

5. The lens assembly as claimed in claim 1, wherein:
the second lens is with negative refractive power;
the third lens further comprises a convex surface facing the image side; and
the fifth lens is with positive refractive power.

6. The lens assembly as claimed in claim 5, wherein the lens assembly satisfies:

$$0.3<|f_2/f_3|<0.9;$$

wherein $f_2$ is an effective focal length of the second lens and $f_3$ is an effective focal length of the third lens.

7. The lens assembly as claimed in claim 1, wherein:
the first lens comprises a convex surface facing the object side and a concave surface facing the image side;
the fourth lens further comprises a convex surface facing the image side;
the fifth lens further comprises a convex surface facing the object side;
the sixth lens comprises a concave surface facing the object side and another concave surface facing the image side; and
the seventh lens further comprises a convex surface facing the image side.

8. The lens assembly as claimed in claim 1, wherein:
both of an object side surface and an image side surface of the third lens are aspheric surfaces;
both of an object side surface and an image side surface of the fourth lens are aspheric surfaces; and
both of an object side surface and an image side surface of the seventh lens are aspheric surfaces.

9. The lens assembly as claimed in claim 1, wherein the lens assembly satisfies:

$$0.3<|f_2/f_3|<0.9;$$

wherein $f_2$ is an effective focal length of the second lens and $f_3$ is an effective focal length of the third lens.

10. The lens assembly as claimed in claim 1, wherein the lens assembly satisfies:

$$1<|f_3/f_4|<7;$$

wherein $f_3$ is an effective focal length of the third lens and $f_4$ is an effective focal length of the fourth lens.

11. The lens assembly as claimed in claim 1, wherein the lens assembly satisfies:

$$1<R_{21}/R_{41}<2.5;$$

wherein $R_{21}$ is a radius of curvature of an object side surface of the second lens and $R_{41}$ is a radius of curvature of an object side surface of the fourth lens.

* * * * *